United States Patent [19]

Ueyoko et al.

[11] Patent Number: 5,772,811
[45] Date of Patent: Jun. 30, 1998

[54] HEAVY DUTY RADIAL TIRE WITH SPECIFIED BEAD CORE INSIDE DIAMETER

[75] Inventors: Kiyoshi Ueyoko, Kobe; Shuichi Sakamoto, Akashi; Tsuneyuki Nakagawa; Kazuki Numata, both of Shirakawa, all of Japan

[73] Assignee: Sumitomo Rubber Industries, Ltd., Hyogo-ken, Japan

[21] Appl. No.: 662,497

[22] Filed: Jun. 13, 1996

[30] Foreign Application Priority Data

Jun. 19, 1995 [JP] Japan .................................. 7-151684
Jun. 29, 1995 [JP] Japan .................................. 7-163809
Mar. 22, 1996 [JP] Japan .................................. 8-066277

[51] Int. Cl.⁶ .............................. B60C 9/08; B60C 15/00; B60C 15/024; B60C 15/04
[52] U.S. Cl. ............................ 152/540; 152/454; 152/525; 152/539; 152/541; 152/544; 152/546; 152/547; 152/548; 152/554
[58] Field of Search .................................. 152/539, 544, 152/543, 540, 548, 546, 554, 547, 525, 541, 454; 245/1.5

[56] References Cited

FOREIGN PATENT DOCUMENTS

| 0533425 | 3/1993 | European Pat. Off. . |
| 4136528 | 5/1992 | Germany . |
| 5-345507 | 12/1993 | Japan ....................................... 245/1.5 |
| 2187146 | 9/1987 | United Kingdom . |

OTHER PUBLICATIONS

Patent Abstracts of Japan, vol. 94, No. 011, 8 Nov. 1994, & JP-A-06 312605.
Patent Abstracts of Japan, vol. 017, No. 610 (M-1508), 10 Nov. 1993 & JP-A-05 185811, 27 Jul. 1993.

*Primary Examiner*—Adrienne C. Johnstone
*Attorney, Agent, or Firm*—Birch, Stewart, Kolasch & Birch, LLP

[57] ABSTRACT

A heavy duty radial tire is to be mounted on a 15 degree drop center rim. In a mounted state that the tire is mounted on the rim and inflated to 0.5 ksc but not loaded, the inside diameter BC of the bead cores at the radially innermost point thereof is set to being not more than the diameter BT at the heel point of the bead portions. In a demounted state that the tire is demounted from a rim, the bead bottom is tapered towards the axial inside of the tire at an angle θ of from 1.0 to 1.9 times the angle α of the tapered bead seat of the rim. In the mounted state, the bead core has a radially inner surface tapered at the substantially same angle as the bead seat, and the axial distance BP of the axially inner end of this tapered inner surface from the bead heel point is set in the range of from 1.3 to 2.1 times the maximum width BW of the bead core measured in the direction parallel to the bead seat. A straight line drawn between a point P2 at which the carcass main portion starts to contact the bead core and a point P3 at which the carcass main portion and a radially extending straight line passing the axially inner end of the radially inner surface of the bead core intersect each other, is inclined at angle β of from 45 to 60 degrees with respect to the tire axial direction.

5 Claims, 4 Drawing Sheets

HEAVY DUTY RADIAL TIRE WITH SPECIFIED BEAD CORE INSIDE DIAMETER

BACKGROUND AND SUMMARY OF THE INVENTION

The present invention relates to a pneumatic tire, more particularly a heavy duty radial tire mounted on a 15 degree drop center rim, which has an improved bead structure.

In general, heavy duty radial tires such as truck/bus tires are mounted on a tapered rim such as a 15 degree drop center rim because, by increasing the tire inner pressure, the bead bottom of the tire tightly fits on the bead seat of the rim, and a large engaging force can be obtained.

On the other hand, heavy duty radial tires are usually used under a heavy load condition such that the tire deflects more than 15%. Accordingly, in comparison with the tires in other fields such as passenger tires, a particularly high structural durability is required for the bead portions of tires.

In the conventional heavy duty tires, therefore, to reinforce the bead portion, reinforcing layers called bead fillers and the like are utilized. Also, to increase the bead rigidity, a hard rubber compound is used. Therefore, the bending deformation of the bead portions is reduced.

However, an increase in the bead rigidity tends to cause a reduction in the engaging force between the tire and the rim, and as a result rim chafe is liable to occur.

In the laid-open Japanese patent application JP-A-5-185811, a radial tire is disclosed, wherein the tire bead bottom is inclined at a slightly larger angle than the bead seat in order to increase the engaging force. As a result, rim chafing can be improved.

In this proposal, however, when the bead portion is greatly deformed under overload conditions, which are very usual in this tire field, a loose ply edge failure can occur on the bead filler, carcass and the like, which results in an unexpected decrease in the bead durability.

It is therefore, an object of the present invention to provide a heavy duty radial tire, which provides improved bead seating, a rim mounting operation which prevents the bead portions from rim chafing, and an improvement in the resistance to loose ply edge failure which increases bead durability.

The present inventors have discovered that the above-mentioned contradictory problems can be solved by specifically limiting the position and size of the bead core disposed in the tire bead portions, thereby accomplishing the present invention.

According to one aspect of the present invention, a heavy duty radial tire mounted on a 15 degree drop center rim comprises a tread portion, a pair of sidewall portions, a pair of bead portions with a bead core therein, a carcass comprising a main portion extending between the bead portions and a pair of turnup portions, turned up around the bead cores from the axially inside to the outside of the tire, and a belt disposed radially outside the carcass and inside the tread portion, wherein in the mounted state, that the tire is mounted on a standard rim and inflated to an air pressure of 0.5 ksc, but not loaded, the inside diameter BC of the bead cores at the radially innermost point thereof is not more than the diameter BT at the bead heel point. Here, the bead heel point is the intersecting point between the bottom line and axially outer surface line of the bead portion.

As a result, the bead core comes close to the bead seat of the rim, and the movement of the carcass and rubber around the bead core under heavy load conditions is decreased, and thus the bead deformation is also decreased. Therefore, the danger of ply looseness can be avoided, and the bead portion is greatly improved in durability. Accordingly, the conventional bead reinforcing layer can be removed, and the tire weight can be reduced.

Preferably, the difference between the diameters BC and BT is at least 2 mm, whereby the bead deformation is more effectively reduced, and the bead toe can be prevented from being lifted up.

In the mounted state, the minimum distance between the carcass and bead seat is at least 1.5 mm in order to prevent the carcass cords from being exposed.

Further, in the state of being demounted from the rim, the bead bottom is inclined or tapered towards the axial inside at an inclination angle θ of from 1.0 to 1.9 times the inclined angle α of the tapered bead seat of the rim. As a result, the engaging force between the tire bead and rim can be increased, without making the rim mounting operation difficult and the resistance to rim chafing can be improved in a well balanced manner. If the angle θ is less than 1.0 times the angle α, the rim engaging force can not be effectively increased, and the resistance to rim chafing is decreased. If the angle θ is more than 1.9 times the angle α, it becomes necessary to greatly compress the bead bottom part when the tire is mounted on a rim.

In the mounted state, the cross section of the bead core has a side adjacent to the bead seat which is substantially parallel to the bead seat. In other words, the bead core has a radially inner surface tapered at substantially the same angle as the bead seat. As a result, the seating of the bead portion becomes stable, which can improve the resistance to rim chafing, and the occurence of ply looseness on the axially inside of the bead core can be effectively controlled to increase durability.

The axial distance BP of the axially inner end of this tapered inner surface from the heel point is set in the range of from 1.3 to 2.1 times the maximum width BW of the bead core measured in the direction parallel to the bead seat. As a result, the contact pressure between the bead bottom and bead seat becomes substantially constant. Not only the resistance to rim chafing and rim mounting operation are improved, but also the occurence of ply looseness due to a partial stress in the bead portion decreases, and the durability can be increased. Further, the inclination of the carcass in the bead portion is optimized, and the thickness of the bead portion is decreased to lessen heat generation. If the distance BP is less than 1.3 times the width BW, the bead toe is liable to be raised under an extremely heavy load condition. If more than 2.1 times, it becomes difficult to reduce the deformation of the bead portion.

Further, a straight line drawn to pass a point P2 at which the carcass main portion starts to contact the bead core and a point P3 at which the carcass main portion and a radially extending straight line passing the axially inner end of the radially inner surface of the bead core intersect each other, is inclined at an angle β of from 45 to 60 degrees with respect to the tire axial direction. As a result, the inclination of the carcass becomes substantially the same as that of the carcass line when the tire is inflated, and the rubber thickness of the bead portion is decreased to decrease the heat generation. Thus, bead damage can be prevented. If the angle β is less than 45 degrees, the bead core excessively shifts towards the axial inside, and as a result, the rubber thickness of the bead portion axially outside of the bead core is excessively increased to increase heat generation. If the angle β is more than 60 degrees, the rubber thickness is excessively increased on the axially inside of the bead core, which is not preferable.

In a region Y between the above-mentioned point P2 and a point P1 at which the carcass main portion contacts with the radially outer edge of the bead apex, the carcass main portion is substantially straight. As a result, the carcass cord path is minimized, and the carcass line closely resembles that in the loaded state, and the axially outward swelling of the carcass when loaded is gone. Thus, the deformation of the bead portion is greatly reduced. Further, as the carcass main portion comes close to the turnup portion, the bead apex rubber volume is further decreased. And the compressive stress in the turnup portion can be greatly decreased because the turnup portion approaches the stress neutral line. Furthermore, as the bead deformation decreases, it becomes possible to eliminate the conventionally used bead reinforcing layers. Therefore, the volume of the bead portion can be greatly decreased to decrease heat generation, and the bead durability is further improved.

BRIEF DESCRIPTION OF THE DRAWINGS

An embodiment of the present invention will now be described in detail in conjunction with the accompanying drawings; wherein.

DETAILED DESCRIPTION OF THE INVENTION

Figure 1:
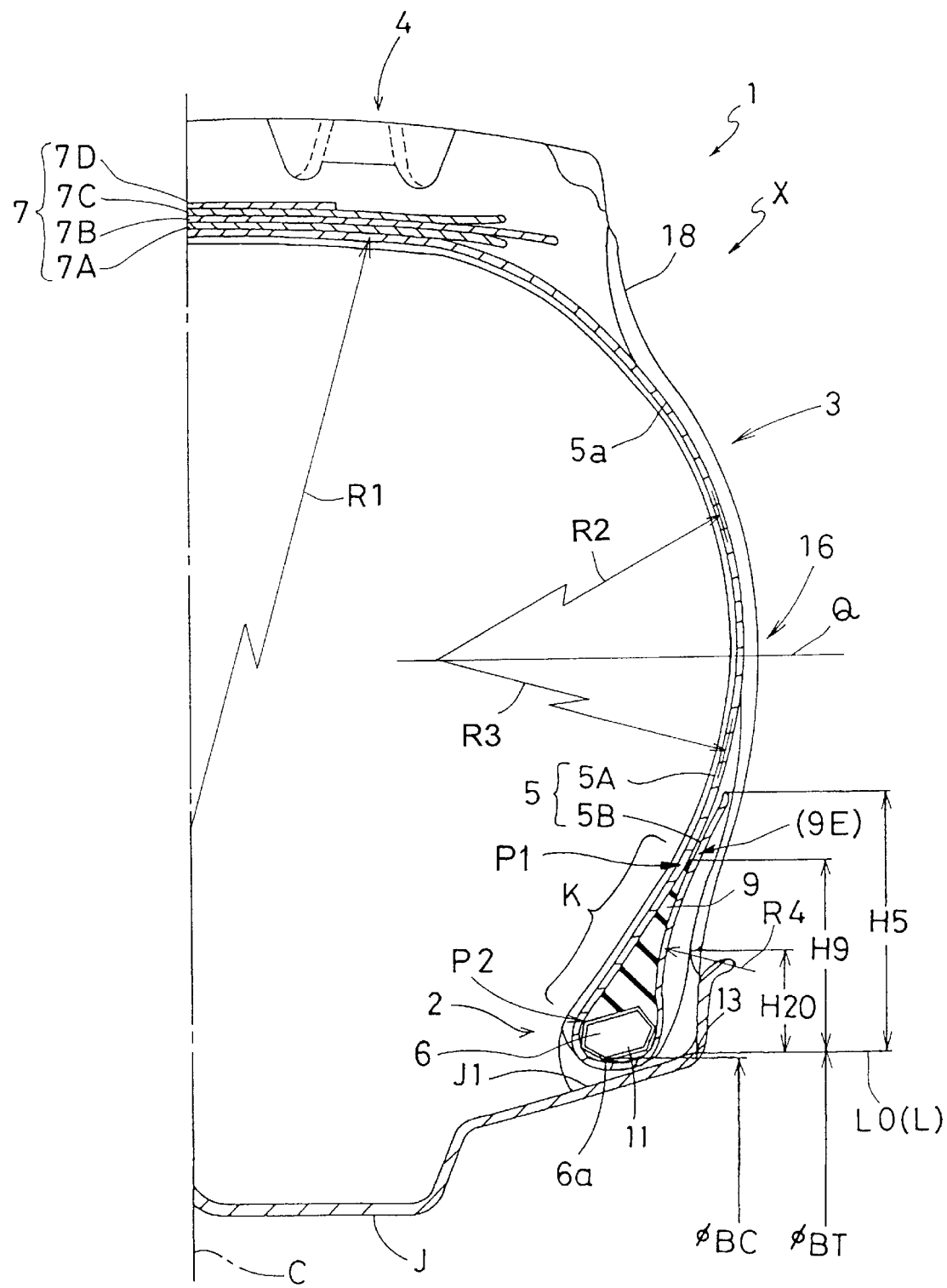
FIG. 1 is a cross sectional view of an embodiment of the present invention showing the state mounted on a rim.

FIG. 1 shows a heavy duty radial tire 1 according to the present invention in its mounted state X where the tire is mounted on a standard rim, that is, a 15 degree drop center rim J and inflated to a profiling inner pressure of 0.5 ksc.

The radial tire 1 has a pair of axially spaced bead portions 2 with a bead core 6 therein, a pair of sidewall portions 3 each extending radially outwardly from each of the bead portions 2, and a tread portion 4 extending between the radially outer ends of the sidewall portions 3, The tire 1 comprises a carcass 5 having a main portion 5A extending between the bead portions 2 through the tread portion 4 and sidewall portions 3 and a pair of turnup portions 5B turned up around the bead cores 6 from the axially inside to outside of the tire, a belt 7 disposed radially outside the carcass 5 and inside the tread portion 4, a tread rubber disposed radially outside the belt 7 defining the tread portion, and a pair of sidewall rubbers 17 disposed axially outside the carcass defining the axially outer surface of the sidewall portions 3.

The belt 7 in this embodiment comprises four plies of steel cords disposed to cross each other. For example, the steel cords of the radially innermost ply 7A are laid at an angle of from 50 to 70 degrees with respect to the tire equator C, and the steel cords of each of the three outer plies 7B, 7C, 7D are laid at an angle of not more than 30 degrees with respect to the tire equator C.

Figure 2:
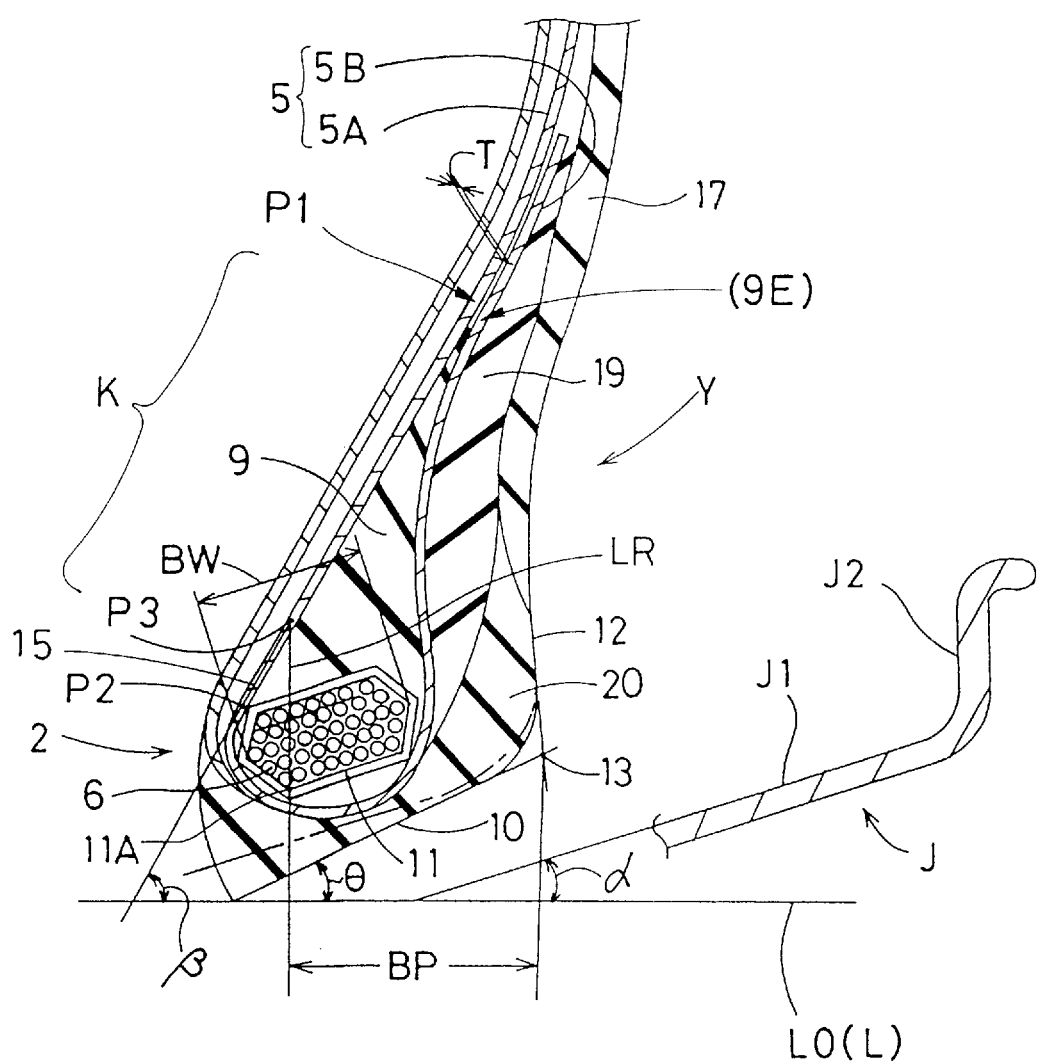
FIG. 2 is a cross sectional view of the bead portion in the state of not being mounted on a rim.

FIG. 2 shows the bead portion 2 in the demounted state Y in which the tire 1 is not mounted on a rim. In this demounted state, the bead portion 2 has a bead bottom 10 tapered towards the axially inside of the tire. The taper angle θ with respect to an axial line L is set in the range of from 1.0 to 1.9 times, preferably 1.2 to 1.9 times the taper angle α of the tapered bead seat J1 of the rim J.

The bead core 6 has a hexagonal sectional shape to withstand a heavy load, and one side 11 thereof is substantially parallel with the bead seat J1 in the mounted state X. That is, as the bead core 6 is a ring body, it has an axially inwardly tapered face 11 corresponding to the side 11.

Further, the axial length BP measured from the axially inner edge 11A of the tapered face 11 to the bead heel point 13 is set in the range of from 1.3 to 2.1 times the width BW of the bead core 6 measured parallel with the bead seat J1. The bead heel point 13 is defined as the intersection between the extension line of the axial outer surface 12 and the extension line of the bead bottom 10. The axial outer surface 12 of the bead portion 2 contacts the axially inner surface of the rim flange J2.

In the mounted state X, the inside diameter BC of the bead core 6 at the radially innermost point 6a thereof is not more than the inside diameter BT at the heel point 13, more preferably not more than the inside diameter BT minus 2 mm.

The carcass 5 comprises at least one ply of rubberized cords arranged radially at an angle of from 90 to 70 degrees with respect to the tire equator C to have a radial or semiradial radial ply structure. For the carcass cords, organic fiber cords, e.g. polyester, aromatic polyamide, nylon, rayon and the like and steel cords can be used. The carcass 5 in this embodiment consists of one ply 5a of steel cords arranged at 90 degrees with respect to the tire equator C. Between the main portion 5A and each turnup portion 5B of the carcass 5, a bead apex rubber 9 extending and tapering radially outwardly from the bead core 6 is disposed.

The main portion 5A of the carcass 5 substantially directly abuts to the axially inner surface of the bead apex rubber 9.

Figure 3:
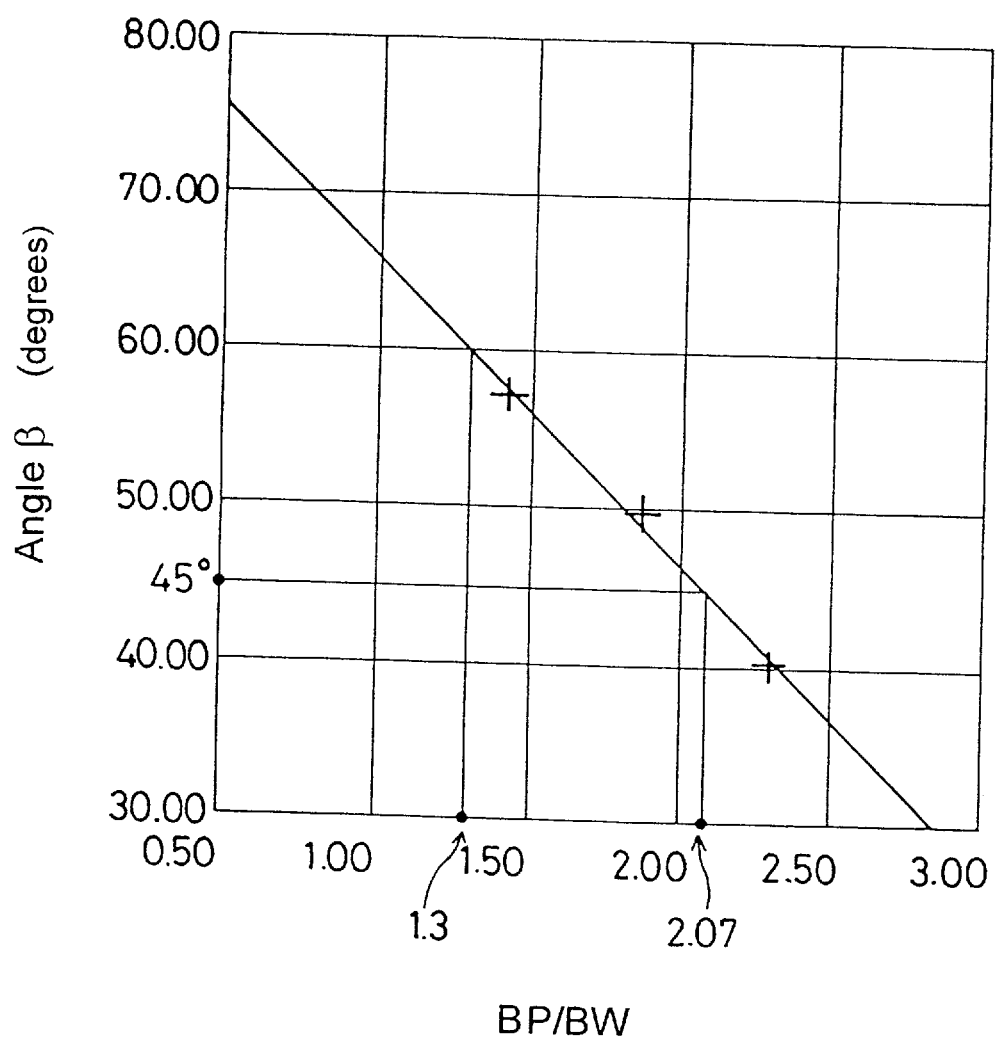
FIG. 3 is a graph showing a correlation between the BP/BW ratio and the angle β.

When a straight line 15 is drawn to extend between a point P2 at which the main portion 5A detaches from the bead core 6 and an intersecting point P3 is disposed between a radial line LR passing through the axially inner edge 11A of the tapered face 11 and the main portion 5A, the straight line 15 inclines at an angle β of from 45 to 60 degrees with respect to the tire axial direction (line L). This limitation is based on the inventors' findings that, as shown in FIG. 3, there is a negative correlation between the angle β and the ratio BP/BW of the length BP to the width BW. When the angle is set in the range of from 45 to 60 degrees, it becomes possible to bring the inclination of the main portion 5A close to that of the carcass line when the tire is inflated.

Figure 4:
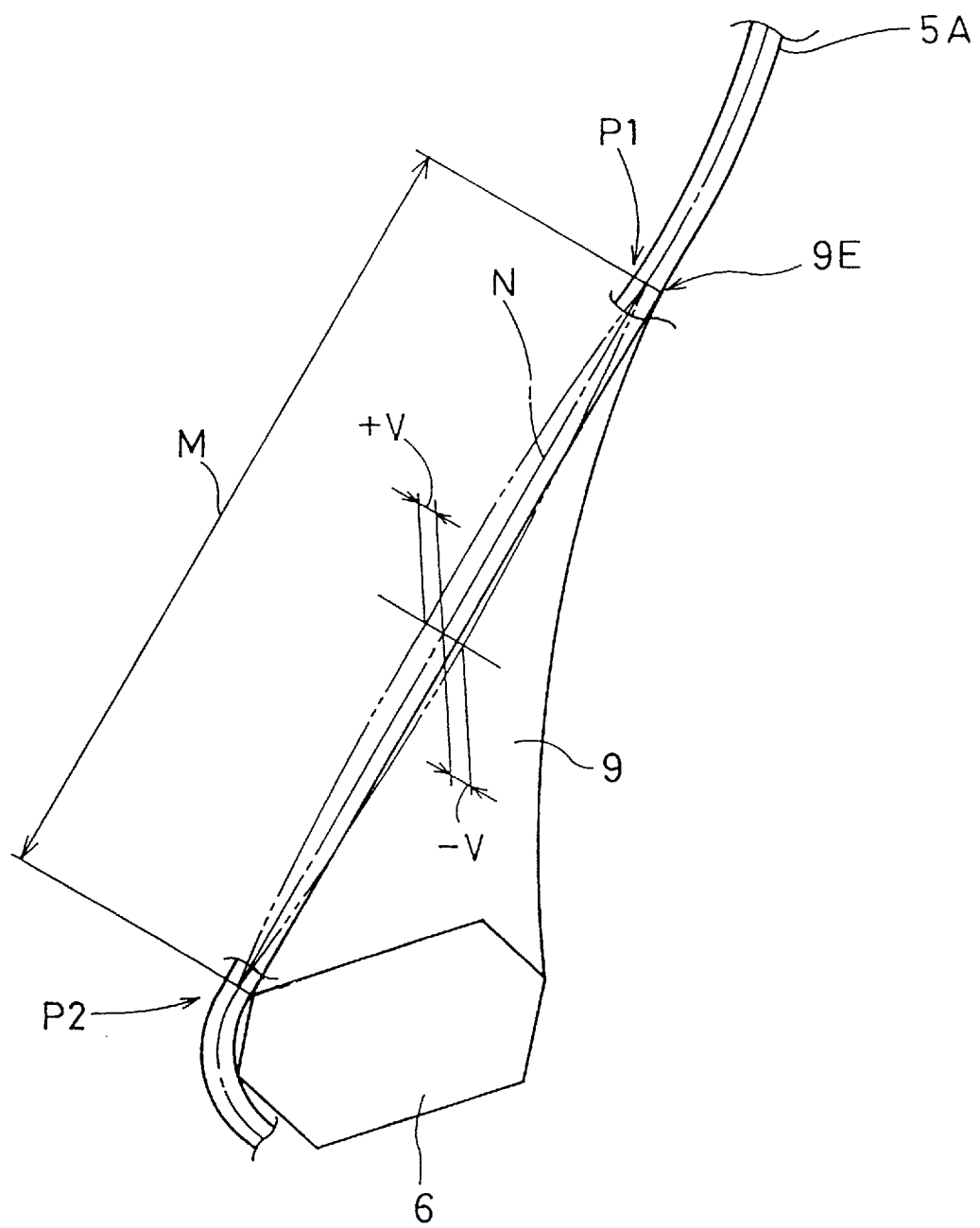
FIG. 4 is a diagram for explaining the carcass line in its substantially straight portion.

In the mounted state X, as shown in FIG. 4, the carcass line of the main portion 5A, that is, the carcass center line of the main portion 5A is substantially straight in the region K between the above-mentioned lower point P2 and an upper point P1 at which the main portion 5A contacts with the radially outer edge 9E of the bead apex rubber 9. Here, the "substantially straight carcass line" means that its maximum deviation V from the straight line N (of which length is M) drawn from the upper point P1 to the lower point P2, measured normally to the straight line N, is not more than 0.02 times the length M. In the conventional tires, the deviation V is at least 0.055 times the length M and the carcass line is curved, not straight.

As the carcass line is substantially straight in the above-mentioned region K, the carcass is prevented from protruding outwardly of the tire when the tire is loaded, and the deformation of the bead portion 2 is decreased. Further, the thickness of the bead apex rubber 9 decreases, and the carcass turnup portion 5B comes close to the stress neutral line. As a result, the compressive stress acting on the turnup portions 5B is greatly decreased. In this invention, therefore, it becomes possible to eliminate conventional bead reinforcing cord layers disposed around the bead cores and/or axially inside and outside the carcass turnup portions.

If the deviation V is over +0.02M (axially inward, see FIG. 4), the contact pressure between the bead portion 2 and rim flange is excessively increased when a tire load of more than 3 times the standard load and the like is applied, and the durability of the bead portion 2 greatly decreases. If the deviation V is under −0.02M (axially outward), the carcass cord tension decreases, and the carcass cords are waved or undulated in the tread crown part and the buttress part 15, which has a bad effect on the tire profile when the tire is normally inflated and decreases the uneven wear resistance.

Further, between the main portion 5A and each turnup portions 5B and radially outward of the outer edge 9E of the bead apex rubber, a cushion rubber (shown in FIG. 2) having a thickness T of not less than 1.6 mm and a hardness different from the bead apex rubber 9 is disposed, thereby preventing a ply separation due to the sharing force caused by the tire deflection during running.

In the mounted state X, the carcass line in the tread portion 4 is defined by a single radius curvature R1 having the center on the tire equatorial plane. In the sidewall portion 3, the carcass line radially outside the maximum tire width points 16, defined by a single radius of curvature R2 having the center on a straight line Q drawn to extend between the two maximum tire width points 16 in the sidewall portions, and the carcass line radially inside the maximum tire width points 16 are defined by a single radius of curvature R3 having its center on the above-mentioned axial line Q. The radius R1 is larger than the radius R2, and the radius R2 is substantially equal to the radius R3. Near or at, in this embodiment at the upper point P1, the curved part of the single radius curvature R3 and the substantially straight part in the region K are smoothly connected with each other without forming an inflection point.

If the boundary between the smoothly connected straight part and curved part (R3) is located radially outward of the point P1, it becomes necessary for maintaining such a profile to dispose a rigid reinforcing layer radially outside the radially outer edge 9E of the bead apex rubber and/or to increase the rubber volume, and thus the tire weight and heat generation during running are increased. If such reinforcing layer is disposed, stress concentrates on the radially outer edge thereof, and ply separation failure is liable to occur.

Such stress concentration can be avoided by substantially aligning the boundary with the outer edge 9E or the point P1. Thus, it is not necessary to dispose the reinforcing layer and to increase the rubber volume.

Further, the turnup portions 5B of the carcass 5 have a concave part substantially directly contacting the axially outside surface of the bead apex rubber 9. The carcass line of this concave part has a single radius of curvature R4 whose center is outside the tire. The radius R4 is smaller than the radius R3. By profiling the turnup portions 5B in this way, the volume of the bead apex rubber 9 can be further decreased to prevent loose ply failure.

The height H9 of the radially outer edge 9E of the bead apex rubber is in the range of from 0.1 to 0.3 times the height Hk of the radially outer surface of the carcass 5 at the tire equator, each from the bead base line L0 passing the two heel points 13. If the bead apex height H9 is less than 0.1 Hk, the carcass 5 is bent abruptly near the bead apex rubber 9, which is liable to cause air-remains in manufacturing the tire and carcass cord cutting during running. If the bead apex height H9 is more than 0.3 Hk, heat generation increases causing a deterioration in bead durability and tire weight increases.

The height H9 is preferably not more than 0.25 Hk, more preferably not more than 0.20 Hk.

The radius of curvature R3 is preferably in the range of 0.75 to 1.15 times the carcass height Hk. If R3 is less than 0.75 Hk, the volume of the bead portion 2 increases, which increases tire weight, and also the heat generation during running increases, which decreases durability. If R3 is more than 1.15 Hk, the manufacture of such a tire becomes difficult.

The bead portion 2 is provided with a radially extending side packing rubber 19 and a chafer rubber 20.

The side packing rubber 19 is disposed between the turnup portion 5B of the carcass 5 and a radially inner part of the sidewall rubber 17.

The chafer rubber 20 extends from the axial inside to outside of the bead core and covers the axial outside of the tapered, radially inner edge part of the side packing rubber 19. The axially outer part of the chafer rubber 20 is overlap-jointed with the tapered radially inner edge part of the sidewall rubber 17 as shown in FIG. 2. As a result, the chafer rubber 20 defines the bottom surface 10 and the axial outer surface 12 of the bead portion.

The bead apex height H9, the height H5 of the axially outer edge of the turnup portion 5B, and the height H20 of the radially outer edge of the chafer rubber 20, each from the bead base line L0, are H20<H9<H5.

The 100% modulus MS of the sidewall rubber 17 is 10 to 20 kgf/sq.cm. The 100% modulus MP of the side packing rubber 19 is 14 to 47 kgf/sq.cm. The 100% modulus MA of the bead apex rubber 9 is 14 to 84 kgf/sq.cm. The 100% modulus MC of the chafer rubber 20 is 55 to 71 kgf/sq.cm. The 100% modulus MT of the topping rubber for the carcass 5 is 37 to 47 kgf/sq.cm. As a result, the bead rigidity is optimized to effectively mitigate the stress of the bead portion 2 into a wide range. Therefore, the carcass cords are prevented from being bent partially around the radially outer edge of the bead apex 9, and their fatigue and separation failure can be avoided.

Further, as the 100% modulus MS is low, the sidewall rubber 17 can be expanded or compressed relatively easily, accompanying a bending deformation of the carcass 5. The resistance to rim chafing is improved by the high modulus chafer rubber 20. Thus, the separation from the carcass 5 is prevented, and a stress transfer to the bead portion 2 can be avoided.

If MA is more than 84 kgf/sq.cm, MP is more than 47 kgf/sq.cm, MS is more than 20 kgf/sq.cm and MC is more than 71 kgf/sq.cm, the bead rigidity becomes excessively high, and the strength of the carcass cords decrease around the radially outer edge of the bead apex 9, and a loose ply loose occurs.

If MA and MP are less than 14 kgf/sq.cm, MS is less than 10 kgf/sq.cm and MC is less than 55 kgf/sq.cm, a required minimum rigidity for the bead portion 2 can not be obtained, and thus running performance of the tire greatly decreases.

Further, as the bead apex rubber 9 and side packing rubber 19 are disposed in the bead portion, these rubber layers are required to have a higher rigidity than the sidewall rubber 17. Therefore, it is more preferable that the 100% modulus MA is not less than 64 kgf/sq.cm, and the 100% modulus MP is not less than 37 kgf/sq.cm.

As the 100% modulus MT is more than the moduli MA, MP but less than the modulus MC, the carcass 5 can follow the deformation of the bead portion 2, and loose ply, separation failure can be prevented.

Incidentally, the above-mentioned standard rim is a rim officially approved for the tire by for example JATMA (Japan), TRA (USA), ETRTO (Europe) and the like, and the standard inner pressure and standard load are the maximum air pressure and maximum tire load for the tire specified by the same associations.

Heavy duty radial tires having a size of 11R22.5 and the structure shown in FIG. 1 were made and tested for the following performances. The tire specifications and test results are shown in Table 1.

1) Bead Heat Generation Test

Using a drum tire tester, the test tires mounted on a standard rim (size 22.5×8.25, 15 degree drop center rim), inflated to a standard pressure (8.00 ksc), and loaded with 300% of a standard load (9,000 kg) were run for 5000 km or 10000 km at a speed of 20 km/h, and the temperature was measured at the bead portion every 1000 km. In Table 1, the mean value of the temperature is indicated by an index based on that the conventional tire is 100. The smaller the value, the lower the temperature.

2) Bead Damage Test

After the above-mentioned test 1), the test tires underwent a cut open inspection for ply looseness and the like. The marks o, *1, *2 and *3 in Table 1 are as follows:

o: No ply looseness occurred.

*1: A ply looseness occurred at the carcass turnup edge.

*2: The carcass cords were exposed in the bead bottom and air entered therefrom into the tire inside structure and a looseness was induced.

*3: A separation of the carcass turnup portion was caused.

3) Rim mounting test

When the test tires were mounted on a standard rim (a 15 degree drop center rim, size: 22.5×8.25), the operation efficiency, difficulty and the like were evaluated into three ranks by the operator's feeling. The ranks in Table 1 are as follows:

3: Good

2: Little bad

1: Bad

4) Tire weight

In Table 1, the tire weight is indicated by an index based on that the conventional tire is 100. The smaller the value, the lighter the tire weight.

From the test results, it was confirmed that Example tires 1 to 20 produced less heat and were improved in the bead durability and rim mounting and decreased in the tire weight in comparison with the conventional tire and reference tires.

As described above, according to the present invention, a heavy duty radial tire can be improved in the rim mounting and resistance to rim chafing, and the tire weight can be reduced.

| | Preferable (more preferable) | Con | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|---|---|---|---|---|---|---|---|---|---|---|
| Taper ratio $\theta/\alpha$ | 1.0 to 1.9 (1.2 to 1.9) | 1.5 | 0.8 | 2.2 | 1.5 | 1.5 | 1.5 | 1.5 | 1.5 | 1.5 | 1.5 | 1.5 | 1.0 | 1.2 | 1.5 | 1.9 | 1.5 | 1.5 | 1.5 | 1.5 | 1.5 | 1.5 | 1.5 | 1.5 |
| BT-BC(mm) | >0(>2) | −2 | 5 | 5 | 0 | 5 | 5 | 7 | 5 | 5 | 5 | 5 | 5 | 5 | 5 | 5 | 5 | 5 | 5 | 5 | 5 | 5 | 5 | 5 |
| BP/BW | (1.3 to 2.1) | 1.6 | 1.6 | 1.6 | 1.6 | 1.6 | 1.6 | 1.6 | 1.0 | 1.3 | 2.1 | 2.3 | 1.6 | 1.6 | 1.6 | 1.6 | 1.0 | 1.0 | 1.0 | 1.0 | 1.0 | 1.0 | 1.0 | 1.0 |
| β (deg) | (45 to 60) | 66 | 55 | 55 | 55 | 55 | 55 | 55 | 66 | 60 | 45 | 40 | 55 | 55 | 55 | 55 | 66 | 66 | 66 | 66 | 66 | 66 | 66 | 66 |
| Turned up height H5 (mm) | (>H9) | 65 | 65 | 65 | 65 | 65 | 65 | 65 | 65 | 65 | 65 | 65 | 65 | 65 | 65 | 65 | 65 | 65 | 65 | 65 | 65 | 65 | 65 | 65 |
| Carcass height Hk (mm) | — | 211 | 211 | 211 | 211 | 211 | 211 | 211 | 211 | 211 | 211 | 211 | 211 | 211 | 211 | 211 | 211 | 211 | 211 | 211 | 211 | 211 | 211 | 211 |
| Bead apex height H9 (mm) | (0.1 to 0.3)Hk | 40 | 40 | 40 | 40 | 40 | 40 | 40 | 40 | 40 | 40 | 40 | 40 | 40 | 40 | 40 | 40 | 40 | 40 | 40 | 40 | 40 | 40 | 20 |
| Carcass straight part | | | | | | | | | | | | | | | | | | | | | | | | | |
| V (mm) | — | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.0 | 0 | −1.0 |
| M (mm) | — | 50 | 50 | 50 | 50 | 50 | 50 | 50 | 50 | 50 | 50 | 50 | 50 | 50 | 50 | 50 | 50 | 50 | 50 | 50 | 50 | 50 | 50 | 30 |
| V/M | (+0.02 to −0.02) | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.036 | 0.02 | 0 | −0.02 |
| Carcass line radius | | | | | | | | | | | | | | | | | | | | | | | | | |
| R1 (mm) | (>R2) | 240 | 240 | 240 | 240 | 240 | 240 | 240 | 240 | 240 | 240 | 240 | 240 | 240 | 240 | 240 | 240 | 240 | 240 | 240 | 240 | 240 | 240 | 240 |
| R2 (mm) | (≧R3) | 105 | 105 | 105 | 105 | 105 | 105 | 105 | 105 | 105 | 105 | 105 | 105 | 105 | 105 | 105 | 105 | 105 | 105 | 105 | 105 | 105 | 105 | 105 |
| R3 (mm) | (0.75 to 1.15)Hk | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 105 |
| R4 (mm) | (<R3) | 60 | 60 | 60 | 60 | 60 | 60 | 60 | 60 | 60 | 60 | 60 | 60 | 60 | 60 | 60 | 60 | 60 | 60 | 60 | 60 | 60 | 60 | 45 |
| 100% modulus (kgf/sq. cm) | | | | | | | | | | | | | | | | | | | | | | | | | |
| Sidewall rubber | (10 to 20) | 15 | 15 | 15 | 15 | 15 | 15 | 15 | 15 | 15 | 15 | 15 | 15 | 15 | 15 | 15 | 42 | 15 | 15 | 15 | 15 | 15 | 15 | 15 |
| Side packing rubber | (14 to 47) | 19 | 19 | 19 | 19 | 19 | 19 | 19 | 19 | 19 | 19 | 19 | 19 | 19 | 19 | 19 | 42 | 10 | 42 | 50 | 42 | 42 | 42 | 42 |
| Bead apex | (14 to 84) | 19 | 19 | 19 | 19 | 19 | 19 | 19 | 19 | 19 | 19 | 19 | 19 | 19 | 19 | 19 | 75 | 75 | 75 | 75 | 75 | 75 | 75 | 75 |
| Bead Chafer rubber | (55 to 71) | 63 | 63 | 63 | 63 | 63 | 63 | 63 | 63 | 63 | 63 | 63 | 63 | 63 | 63 | 63 | 75 | 63 | 63 | 50 | 50 | 50 | 50 | 50 |
| Carcass topping rubber | (37 to 47) | 42 | 42 | 42 | 42 | 42 | 42 | 42 | 42 | 42 | 42 | 42 | 42 | 42 | 42 | 42 | 42 | 42 | 42 | 42 | 42 | *42 | 42 | 42 |
| Durability test 1 (5000 km) | | | | | | | | | | | | | | | | | | | | | | | | | |
| Bead heat generation | | 100 | 100 | 100 | 99 | 85 | 80 | 100 | 130 | 85 | 90 | 96 | 100 | 85 | 80 | 80 | 140 | 78 | 88 | 88 | 85 | 73 | 55 | 54 |
| Bead damage | | *1 | *1 | *1 | ○ | ○ | ○ | *2 | *1 | ○ | ○ | *1 | ○ | ○ | ○ | ○ | *1 | *1 | ○ | ○ | ○ | ○ | ○ | ○ |

-continued

| | Preferable (more preferable) | Con | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|---|---|---|---|---|---|---|---|---|---|---|
| Durability test 2 (10000 km) | | | | | | | | | | | | | | | | | | | | | | | | |
| Bead heat generation | | — | — | — | — | — | — | — | — | — | — | — | — | — | — | — | — | — | — | — | 100 | 84 | 65 | 62 |
| Bead damage | | — | — | — | — | — | — | — | — | — | — | — | — | — | — | — | — | — | — | — | *3 | ○ | ○ | ○ |
| Rim mounting | | 2 | 3 | 1 | 3 | 3 | 1 | 3 | 3 | 3 | 1 | 3 | 3 | 3 | 2 | 3 | 3 | 3 | 3 | 3 | 3 | 3 | 3 |
| Tire weight | | 100 | 91 | 93 | 92 | 91 | 91 | 90 | 91 | 94 | 98 | 91 | 91 | 91.5 | 92 | 91.5 | 91.5 | 91.5 | 91.5 | 91.5 | 89.0 | 86.5 | 85.0 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A heavy duty radial tire to be mounted on a 15 degree drop center rim, the tire comprising a tread portion, a pair of sidewall portions, a pair of bead portions with a bead core therein, a carcass comprising a main portion extending between the bead portions and a pair of turnup portions turned up around the bead cores from the axial inside to the outside of the tire, and a belt disposed radially outside the carcass and inside the tread portion, wherein, in a mounted state where the tire is mounted on the standard 15 degree drop center rim and inflated to a pressure of 0.5 ksc but not loaded, the inside diameter BC of the bead cores at the radially innermost point thereof is not more than the diameter BT at the heel point of the bead portions.

2. The heavy duty radial tire of claim 1, wherein in the state of the tire demounted from the rim, the bead bottom of each bead portion is tapered towards the axial inside of the tire at an angle $\theta$ of from 1.0 to 1.9 times the angle $\alpha$ of the tapered bead seat of the rim.

3. The heavy duty radial tire of claim 2, wherein each bead core has a radially inner surface tapered at substantially the same angle as the bead seat of the rim in the mounted state, and the axial distance BP of the axially inner end of this tapered inner surface from the heel point is set in the range of from 1.3 to 2.1 times the maximum width BW of the bead core, measured in a direction parallel to the bead seat.

4. The heavy duty radial tire of claim 3, wherein in each bead portion a straight line, drawn between a point P2 where the carcass main portion starts to contact the bead core and a point P3 where the carcass main portion and a radially extending straight line passing the axially inner end of the tapered radially inner surface of the bead core intersect each other, is inclined at an angle $\beta$ of from 45 to 60 degrees with respect to the tire axial direction.

5. The heavy duty radial tire of claim 1, wherein each bead portion is provided between the main portion and the turnup portion of the carcass with a bead apex rubber tapering radially outwardly from the bead core, and in the mounted state, in the region K between a point P2 where the carcass main portion starts to contact the bead core and a point P1 where the carcass main portion contacts with the radially outer edge of the bead apex rubber, the carcass line of the carcass main portion is substantially straight so that the maximum deviation V of the carcass line from a straight line N drawn from the point P1 to the point P2, measured normally to the straight line N, is not more than 0.02 times the length M of the straight line N.

* * * * *